E. F. W. ALEXANDERSON.
SINGLE PHASE MOTOR.
APPLICATION FILED DEC. 26, 1907.
920,710.
Patented May 4, 1909.
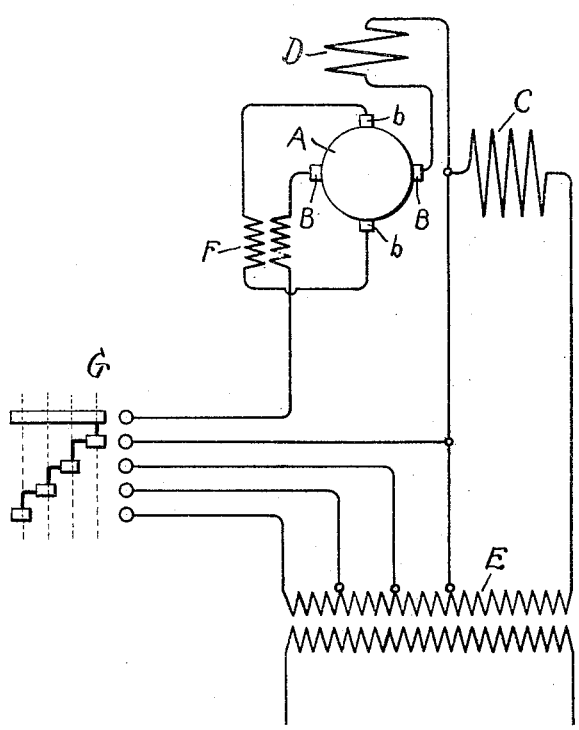
Witnesses:
Earl G. Klock.
J. Ellis Glen.
Inventor:
Ernst F. W. Alexanderson,
by
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE MOTOR.

No. 920,710.　　　　Specification of Letters Patent.　　　Patented May 4, 1909.

Application filed December 26, 1907. Serial No. 408,143.

*To all whom it may concern:*

Be it known that I, ERNST F. W. ALEXANDERSON, a citizen of the United States, residing at Schenectady, in the county of Schenectady and State of New York, have invented certain new and useful Improvements in Single-Phase Motors, of which the following is a specification.

My invention relates to single-phase motors of the commutator type, and its object is to improve the commutation, efficiency and power-factor of such motors.

There is one well-known type of motor, which is sometimes called the "compensated" repulsion motor, in which the stator is provided with an inducing winding, and the armature with two sets of commutator brushes; one short-circuiting the armature on the line of magnetization of the inducing winding, and the other displaced ninety electrical degrees from the first set, and serving as means for supplying to the armature the exciting current of the motor. Such a motor, as compared with the ordinary repulsion motor, where the exciting or cross-field is produced by a winding on the stator, has a higher power-factor, because the electromotive force induced in the armature winding between the exciting brushes, due to rotation in the field of the inducing winding, tends to neutralize the self-induction of the exciting circuit,—that is, the circuit formed by the armature winding between the exciting brushes. It is for this reason that the motor is frequently termed a "compensated" repulsion motor. The commutation of this type of motor is excellent at synchronism, if the motor is properly designed, but in passing above synchronism the commutation rapidly becomes poor.

In my prior application Serial No. 383,807, filed July 15, 1907, I have disclosed a type of motor having inducing and exciting windings on the stator, in which the armature is short-circuited at starting, while for high speeds a shunt voltage is impressed on the armature and exciting winding in series. The purpose of impressing the shunt voltage on the armature is to reduce the amount of the inducing field, which assists commutation at low speeds, but becomes excessive in its effect on commutation at high speeds. The purpose of including the exciting winding in circuit with the armature and the shunt voltage is to provide for the effect of commutation reactance. The reactance of the exciting winding in the armature circuit produces leakage fields which, when cut by the armature coils short-circuited by the brushes in commutation, induce in those coils electromotive forces which neutralize the electromotive force of commutation reactance. This motor, if properly designed, has excellent commutation at very high speeds, but its power-factor is somewhat lower than that of the compensated repulsion motor.

My present invention consists in combining the advantages of both types of motors briefly described above. I accomplish this by providing the motor both with an exciting winding on the stator and with exciting brushes. Since a part of the excitation is produced in the armature by the current supplied through the exciting brushes, the power-factor is higher than if all the excitation were produced by the exciting winding on the stator, while the presence of the exciting winding on the stator makes it possible to impress a shunt voltage on the main armature brushes and the exciting winding in series, so as to obtain excellent commutation at high speeds.

My invention will best be understood by reference to the accompanying drawing, which shows diagrammatically a motor arranged in accordance with my invention.

In the drawing, A represents diagrammatically a motor armature, which is provided with main commutator brushes B B and auxiliary or exciting brushes *b b*.

C represents the inducing winding on the stator, which produces a magnetization in line with the main brushes B B.

D represents the exciting winding on the stator producing a magnetization in line with the exciting brushes *b b*.

E represents a transformer for supplying current to the motor.

F represents a transformer having its primary in series with the main brushes B B, and its secondary in series with the exciting brushes *b b*. The exciting brushes are thus connected in series with the main brushes through the transformer F.

G represents a controlling switch for the motor, which is shown diagrammatically with its contacts developed on a plane surface.

It will be seen that the inducing winding C, the exciting winding D, and the main brushes B B are connected in series with each other. The inducing winding C is connected across a portion of the supply transformer E. With the switch G in its first position, a short-circuit is formed, including the main brushes B B, the exciting winding D, and the primary of transformer F. The motor, consequently starts like a repulsion motor, the current induced in the armature between the main brushes B B being supplied directly to the exciting winding D and through the transformer to the exciting brushes b b. When the motor has started, and the switch G is moved to its second position, a small shunt voltage, derived from the transformer E, is included in the circuit of the main brushes and the exciting winding for the purpose of improving the commutation, as has been explained. For operation at higher speeds, the switch G is moved to its third and fourth positions, increasing the amount of the shunt voltage impressed on the armature and exciting winding, and thereby adapting the motor for good commutation at those higher speeds.

I have shown the motor diagrammatically. It will be understood that in practice the motor armature would be constructed like that of the usual direct-current motor, while the inducing winding C would be distributed, as is customary in alternating-current repulsion motors. Furthermore, in order that the full benefits of my invention may be obtained with respect to commutation, the armature winding should be given a pitch corresponding to the portion of the periphery of the stator over which the inducing winding C is distributed for reasons fully set forth in my prior applications, Serial Nos. 371,320 and 383,807, filed, respectively, May 1, 1907, and July 15, 1907.

What I claim as new and desire to secure by Letters Patent of the United States, is,

1. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, and means for impressing a shunt voltage on the exciting winding and main brushes in series.

2. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, and means for impressing a shunt voltage on the exciting winding and main brushes in series and for varying the amount of said voltage.

3. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, connections for placing the main brushes and exciting winding in a local closed circuit at starting, and means for introducing a shunt voltage into said closed circuit when the motor has started.

4. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, and a transformer having its primary in series with the main brushes and its secondary in series with the exciting brushes.

5. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, a transformer having its primary in series with the main brushes and its secondary in series with the exciting brushes, and means for impressing a shunt voltage on the main brushes, exciting winding, and transformer primary, in series.

6. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, a transformer having its primary in series with the main brushes and its secondary in series with the exciting brushes, and means for impressing a shunt voltage on the main brushes, exciting winding, and transformer primary, in series, and for varying the amount of said voltage.

7. A single-phase motor of the commutator type having inducing and exciting windings on the stator connected in series with each other, main commutator brushes on the line of magnetization of the inducing winding connected in series with both stator windings, exciting brushes on the line of magnetization of the exciting winding, a transformer having its primary in series with the main brushes and its secondary in series with the exciting brushes, connections for placing the main brushes, exciting winding, and transformer primary, in a local closed circuit at starting, and means for introducing a shunt voltage into said circuit when the motor has started.

In witness whereof, I have hereunto set my hand this 23rd day of December, 1907.

ERNST F. W. ALEXANDERSON.

Witnesses:
BENJAMIN B. HULL,
HELEN ORFORD.